United States Patent [19]

Verbiest et al.

[11] Patent Number: 5,968,202
[45] Date of Patent: Oct. 19, 1999

[54] METHOD OF CLEANING TEXTILE FABRICS

[75] Inventors: Jan Hendrik Maria Verbiest, Antwerp; Jean Wevers, Steenhuffel, both of Belgium

[73] Assignee: The Procter & Gamble Company, Cincinnati, Ohio

[21] Appl. No.: 08/983,204

[22] PCT Filed: Jul. 3, 1996

[86] PCT No.: PCT/US96/11325

§ 371 Date: Jan. 13, 1998

§ 102(e) Date: Jan. 13, 1998

[87] PCT Pub. No.: WO97/03240

PCT Pub. Date: Jan. 30, 1997

[30] Foreign Application Priority Data

Jul. 13, 1995 [EP] European Pat. Off. .............. 95870087

[51] Int. Cl.⁶ .................................. D06B 1/00; D06L 1/12
[52] U.S. Cl. .................................. 8/137; 8/159; 510/276; 510/279; 510/283; 510/284; 510/406; 510/281; 510/295; 510/293; 510/370
[58] Field of Search ........................ 8/137, 159; 510/276, 510/279, 283, 284, 406, 281, 295, 293, 370

[56] References Cited

U.S. PATENT DOCUMENTS

| 3,431,060 | 3/1969 | Pickin ...................................... 510/406 |
| 3,728,265 | 4/1973 | Cella et al. .............................. 510/406 |
| 3,741,902 | 6/1973 | Barrett . |
| 3,762,875 | 10/1973 | Burmeister . |
| 3,781,212 | 12/1973 | Smillie . |
| 3,796,599 | 3/1974 | McLaughlin ............................ 427/242 |
| 3,970,584 | 7/1976 | Hart et al. . |
| 4,243,543 | 1/1981 | Guilbert et al. ......................... 510/234 |
| 4,288,339 | 9/1981 | Wilsberg . |
| 4,336,024 | 6/1982 | Denissenko et al. ....................... 8/142 |
| 4,362,638 | 12/1982 | Caskey et al. . |
| 4,457,857 | 7/1984 | Sepulveda et al. . |
| 4,563,186 | 1/1986 | Flynn et al. ............................... 8/137 |
| 4,749,516 | 6/1988 | Brusky ..................................... 510/284 |

FOREIGN PATENT DOCUMENTS

WO 97/03240  1/1997  WIPO .

Primary Examiner—Alan Diamond
Attorney, Agent, or Firm—J. C. Rasser; B. M. Bolam; D. M. Goodrich

[57] ABSTRACT

A method of cleaning textile fabrics comprising the steps of (i) dispensing a detergent foam from an aerosol container, (ii) dissolving the foam in water to form an aqueous solution; and either subsequently or simultaneously, (iii) agitating the textile fabrics in the aqueous solution.

9 Claims, No Drawings

METHOD OF CLEANING TEXTILE FABRICS

This application is a 371 of PCT/US96/11325 filed Jul. 3, 1996.

The present invention relates to a method for cleaning textile fabrics.

Today's handwashing and machine washing methods for cleaning textile fabrics almost invariably involve dissolving a granular product, or a liquid product, into water to form an aqueous washing solution (the wash "liquor"). For economic usage of the product it is necessary to measure out the granular or liquid product before dissolving it in water. Typically the product is scooped or poured into a measuring cup and then added either directly into water, or via a dispensing drawer or a dispensing device. There is always the risk of spillage. In the case of liquids there is likely to be a residue remaining in the measuring cup, and there is the risk of dripping.

A fabric cleaning foam delivered by means of an aerosol container offers a departure from conventional washing methods.

An improved method is sought for cleaning textile fabrics either by hand, or in a conventional washing machine using a dispensing means which does not require a measuring or dosing step which must be performed either by the consumer, or by special adaptation of the washing machine.

U.S. Pat. No. 3,796,599, issued on Mar. 12, 1974, discloses a fabric cleaning foam delivered using an aerosol container. In particular Example III discloses a detergent composition comprising 28% phosphate, 3% monoethanolamide foaming agent, and 69% water. A CFC propellant was used. However, the compositions are intended for use in a conventional clothes dryer which is stated to provide a tumbling dry-heat, and a substantially anhydrous environment. Washing in aqueous solution is not suggested, indeed it is specifically avoided.

Most conventional detergent active components however are most effective in the presence of water. Surfactants, for example, depend for their surface active effect on a molecule which is hydrophobic on one end and hydrophilic at the other end. The hydrophilic end interacts with water molecules in the aqueous wash solution. Builders and chelants are used in detergent compositions principally for their ability to remove certain metal ions from aqueous solution.

There exists a need to provide detergent active components into a wash solution by simple, mess-free means.

The present invention addresses this need by delivering detergent active components into the wash liquor in the form of a foam dispensed from a conventional aerosol container. It is an advantage of the present method that no scoop or cup, and no measuring device is needed because the foam is dispensed directly from the aerosol container either onto the fabric, or onto the hand, or onto the surface of the water. The amount or "dose" can be readily and accurately estimated by the volume of the foam dispensed from the container. In one embodiment of the invention the aerosol canister itself is provided with a dosing means.

SUMMARY OF THE INVENTION

According to the invention the objective is achieved by a method of cleaning textile fabrics comprising the steps of:
(i) dispensing a detergent foam from an aerosol container;
(ii) dissolving the foam in water to form an aqueous solution; and
(iii) agitating the textile fabrics in the aqueous solution.

In one aspect of the method of the invention, the detergent foam may be completely dissolved in the water before the textile fabrics are introduced to the aqueous solution. In an alternative aspect the dissolving of the foam and the agitation of the fabrics in the water may take place simultaneously.

In a first embodiment of the invention the agitation of the textile fabrics in the aqueous solution is carried out by hand. This is of particular benefit for delicate textile fabrics such as those made from wool or silk.

In a second alternative embodiment of the invention the agitation of the textile fabrics is carried out in a conventional washing machine. Preferably the load of soiled textile fabrics is loaded into the washing machine. The foam may then be dispensed from the aerosol container directly into the machine drum, on top of the textile fabrics, or it may be dispensed onto one of the items of the load, on onto the hand, and then transferred into the machine drum. The washing machine may then be operated in the usual way, that is to say by starting any of the pre-programmed washing cycles.

DETAILED DESCRIPTION OF THE INVENTION

Textile fabrics are any materials made from cloth, including garments such as shirts, blouses, socks, skirts, trousers, jackets, underwear etc, and also including tablecloths, towels, curtains etc. The definition of textile fabrics as used herein does not include carpets and similar floor coverings.

Textile fabrics which are to be used in the present invention are commonly made by weaving or knitting. Many different fibres may be used to produce woven, knitted or other types of textile fabric including synthetic fibres (such as polyester, polyamide, etc.) and natural fibres from plants (such as cotton, hemp) and from animals (such as wool, angora, silk). Blends of different fibres are also commonly used.

Foam is a coarse dispersion of gas in a relatively small amount of liquid. The foams of the present invention are a continuous liquid phase comprising a detergent composition, and a dispersed phase comprising a gas. Typically, the gas "bubbles" of the dispersed phase can vary in size from 50 micrometers to several millimeters.

In general, the quality of the foam is determined by assessing various foam quality attributes, such as: 1) the appearance of the foam as it is determined by the uniformity of the bubble size distribution, as well as by the actual bubble sizes, wherein small and uniformly sized bubbles are generally preferred; 2) the thickness of the foam as it is determined by the apparent foam viscosity, wherein a greater apparent foam viscosity is generally preferred; 3) the density of the foam which is preferably less than 250 g/l, more preferably less than 150 g/l, and most preferably about 100 g/l; and 4) the drainage of the liquid from the foam upon standing, wherein slow drainage of the liquid is generally preferred.

It is important to distinguish between the foam of the present invention and the suds which are commonly encountered in everyday washing process. The foam of the present invention is much more concentrated and comprises less water than conventional suds. Foam as defined herein comprises preferably less than 90%, and more preferably less than 80% by weight of water. The foam of the present invention comprises preferably at least 5%, and less than 18% by weight of a surface active agent. Most preferred foams for use as cleaning compositions comprise at least 5% by weight of anionic surfactant.

On the other hand, suds, which are formed in conventional washing process when detergents are diluted prior to washing, are formed from quite dilute solutions typically 100 g of product in 10 liters of water. The result is a wash liquor which comprises about 99% by weight of water. A layer of suds may form on the surface of the wash liquor, the composition of the suds being similar to that of the wash liquor itself. The surfactant content of the suds will normally be much less than 1%, typically less than 0.3%. Consequently the difference between the foam of the present invention and the suds of a conventional washing process will be understood.

It will also be recognised by the man skilled in the art that suds are often considered undesirable in the washing process and antisuds agents are often employed to reduce or control them. In a washing process in which the solution of detergent active agents is the medium of transport of the actives to the fibre surface, the presence of suds can diminish washing performance. This is because the detergent actives which are in the suds are no longer dissolved in the washing liquor itself, and are not therefore efficiently transported to the fibre surface.

Preferred components of the detergent foam will now be described in more detail.

Water-soluble salts of the higher fatty acids, i.e., "soaps", are useful anionic surfactants in the compositions herein. This includes alkali metal soaps such as the sodium, potassium, ethanolamines, ammonium, and alkylammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the salts of the mixtures of fatty acids derived from coconut oil and tallow, i.e., tallow and coconut soap.

Useful anionic surfactants also include the water-soluble salts, preferably the alkali metal, ethanolamine, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the alkyl sulfates, especially those obtained by sulfating the higher alcohols ($C_8$–$C_{18}$ carbon atoms) such as those produced by reducing the glycerides of tallow or coconut oil; and the alkyl benzene sulfonates in which the alkyl group contains from about 9 to about 15 carbon atoms, in straight or branched chain configuration, e.g., those of the type described in U.S. Pat. Nos. 2,220,099 and 2,477,383; and methyl ester sulphonates. Especially valuable are linear straight chain alkyl benzene sulfonates in which the average number of carbon atoms in the alkyl group is from about 11 to 13, abbreviated as $C_{11}$–$C_{13}$ LAS.

Other anionic surfactants herein are the alkyl glyceryl ether sulfonates, especially those ethers of higher alcohols derived from tallow and coconut oil; coconut oil fatty acid monoglyceride sulfonates and sulfates; salts of alkyl phenol ethylene oxide ether sulfates containing from about 1 to about 10 units of ethylene oxide per molecule and wherein the alkyl groups contain from about 8 to about 12 carbon atoms; and salts of alkyl ethylene oxide ether sulfates containing from about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water soluble salts of olefin sulfonates containing from about 12 to 24 carbon atoms; and beta-alkyloxy alkane sulfonates containing from about 1 to 3 carbon atoms in the alkyl group and from about 8 to about 20 carbon atoms in the alkane moiety.

Water-soluble nonionic surfactants are also useful as surfactants in the compositions of the invention. Indeed, preferred processes use anionic/nonionic blends. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol.

Preferred nonionics are the water-soluble condensation products of aliphatic alcohols containing from 8 to 22 carbon atoms, in either straight chain or branched configuration, with from 1 to 25 moles of ethylene oxide per mole of alcohol, especially 2 to 7 moles of ethylene oxide per mole of alcohol. Particularly preferred are the condensation products of alcohols having an alkyl group containing from about 9 to 15 carbon atoms; and condensation products of propylene glycol with ethylene oxide.

Other preferred nonionics are polyhydroxy fatty acid amides which may be prepared by reacting a fatty acid ester and an N-alkyl polyhydroxy amine. The preferred amine for use in the present invention is N-(R1)-CH2(CH2OH)4-CH2-OH and the preferred ester is a C12–C20 fatty acid methyl ester. Most preferred is the reaction product of N-methyl glucamine (which may be derived from glucose) with C12–C20 fatty acid methyl ester.

Methods of manufacturing polyhydroxy fatty acid amides have been described in WO 9206073, published on Apr. 16, 1992. This application describes the preparation of polyhydroxy fatty acid amides in the presence of solvents. In a highly preferred embodiment of the invention N-methyl glucamine is reacted with a C12–C20 methyl ester.

Semi-polar nonionic surfactants include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be either straight or branched chain and wherein one of the aliphatic substituents contains from about 8 to 18 carbon atoms and at least one aliphatic substituent contains an anionic water-solubilizing group.

Zwitterionic surfactants include derivatives of aliphatic quaternary ammonium phosphonium, and sulfonium compounds in which one of the aliphatic substituents contains from about 8 to 18 carbon atoms.

Useful cationic surfactants include water-soluble quaternary ammonium compounds of the form $R_4R_5R_6R_7N^+X^-$, wherein $R_4$ is alkyl having from 10 to 20, preferably from 12–18 carbon atoms, and $R_5$, $R_6$ and $R_7$ are each $C_1$ to $C_7$ alkyl preferably methyl; $X^-$ is an anion, e.g. chloride. Examples of such trimethyl ammonium compounds include $C_{12-14}$ alkyl trimethyl ammonium chloride and cocalkyl trimethyl ammonium methosulfate. The foam of the present invention can contain neutral or alkaline salts which have a pH in solution of seven or greater, and can be either organic or inorganic in nature. The builder salt assists in providing the desired density and bulk to the detergent granules herein. While some of the salts are inert, many of them also function as detergency builder materials in the laundering solution.

Examples of neutral water-soluble salts include the alkali metal, ethanolamine, ammonium or substituted ammonium chlorides, fluorides and sulfates. The sodium and ethanolamine salts of the above are preferred. Citric acid and, in general, any other organic or inorganic acid may be incorporated into the present invention.

Other useful water-soluble salts include the compounds commonly known as detergent builder materials. Builders are generally selected from the various water-soluble, alkali metal, ethanolamine, ammonium or substituted ammonium phosphates, polyphosphates, phosphonates, polyphosphonates, carbonates, silicates, borates, and polyhyroxysulfonates. Preferred are the sodium and ethanolamine, salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the salts of ethylene diphosphonic acid, the salts of ethane 1-hydroxy-1,1-diphosphonic acid and the salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, incorporated herein by reference. In general, however, phosphates are preferably avoided for environmental reasons.

Examples of nonphosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4.

Particular embodiments of the method of treating textile fabrics with detergent foam will now be described in more detail.

Handwash

The method of the present invention may be used to wash textile fabrics by hand (referred to herein as "handwash"). The foam is dispensed into a container, such as a bucket or a bowl, containing some water. The soiled textile fabrics to be cleaned are then added to the container, and agitated by hand. As the foam dissolves in the water, the active ingredients become dissolved and act upon the dirt and stains on the textile fabrics.

The method of the present invention is particularly well-suited to hand washing of delicate textile fabrics. In particular textile fabrics comprising high levels of wool or silk may be advantageously treated in this way. One particular benefit is a marked reduction in local fabric damage which may occur when conventional laundry processes are used. In conventional laundry processes the detergent composition, the soiled textile fabrics and water are all brought together in a suitable container. At the beginning of the process there are very high local concentrations of active ingredients as they begin to dissolve in the water, but before they have been homogeneously distributed in the water. Such high local concentrations in solution, if they happen to be present on or close to the fabric can cause local colour and fabric damage. This is especially true in the case of high local concentrations of bleaching agents and optical brighteners in solution. This type of local fabric damage is avoided according to the method of the present invention. Because all of the active ingredients are uniformly distributed throughout the large volume of the foam there are no local concentrations of active materials which might cause fabric damage.

It is common practise when washing textile fabrics by hand to allow them to soak in the wash liquor for up to an hour, or for several hours. Such practise is foreseen in this embodiment of the present invention.

A typical handwash composition will comprise some or all of the following components: surfactants (anionic, nonionic, cationic, amphoteric, zwitterionic), detergent builders and chelating agents, soil release polymers, optical brightener, dye transfer inhibition polymer, perfume, enzymes, colorants.

Compositions may be either dilute or concentrated. As defined herein a dilute composition comprises less than 18% by weight of surfactant, and a concentrated solution comprises more than 18% by weight of surfactant.

Surfactants are present in dilute compositions at a level of preferably from 5% to 18% by weight of the composition, preferably at least 10% by weight of the composition.

Detergent builders such as fatty acids, citric acid, succinic acid, phosphate, zeolite are preferably present at a level of up to 90% by weight of the composition, preferably 0.1% to 20% of the composition, more preferably from 0.5% to 10% by weight of the composition. However, for environmental reasons it is preferred that the detergent foam should be substantially free of phosphates. Chelating agent such as phosphonate may be present at a level of from 0% to 5%, and where present preferably from 0.1% to 3% by weight of the composition.

Machine Wash

The method of the present invention may be used to wash textile fabrics in a conventional washing machine (referred to herein as "machine wash" ). The foam of the present invention is simply dispensed into the drum of the washing machine either before or after the soiled textile fabrics have been loaded.

Most commercially available washing machines have automatic washing cycles, and many of these cycles start by the addition of water into the machine drum. The drum is rotated several times thereby distributing the foam and dissolving it in the water.

When water is added at a later part of the cycle most of the foam components will be dissolved or dispersed in the water, probably resulting in a layer of suds in the machine. As noted above, these suds which have a high water content and a low surfactant content should not be considered as foam within the meaning of the present invention. The wash cycle may be completed by any combination of washing, rinsing, conditioning and/or drying steps, during any one of which additional wash or rinse additives may be introduced into the machine drum.

The compositions suitable for machine wash foams are similar to those described above for handwash foams.

Aerosol Containers

Aerosol containers are sealed containers, such as an essentially cylindrical bottle, having a dispensing means such as a nozzle. The container contains the composition and propellant gas. Suitable containers may be made from any material, especially aluminium, tin-plate, plastics including PET, OPP, PE or polyamide and including mixtures, laminates or other combinations of these. Foam is dispensed when the nozzle is activated and the detergent is released together with the propellant gas. The propellant gas expands to form many "bubbles" within the composition thereby creating the foam. Preferred gases are hydrofluorocarbons, chlorofluorocarbons, alkanes including propane and butane, carbon dioxide, nitrous oxide, nitrogen, air or mixtures thereof.

Various ways to pressurise the propellant gas are known in the art. For example the gas may be pressurised at the time of packing. The product may be physically separated from a compressed gas by a membrane such as rubber under tension. Alternatively a means for pressurising the gas subsequently by mechanical action may be provided (so-called "pump and spray" systems).

Various apparatus for delivering foams are described in U.S. Pat. No. 5,364,031 issued on Nov. 15, 1994 entitled "Foam Dispensing Nozzles and Dispensers Employing Said Nozzles".

Any nozzle or nozzle/valve assembly which provides a means for releasing the mixture of detergent ingredients from the container and provides a foam is suitable for use in the present invention. The Precision Valve Company (Valve Précision in France) supplies a range of nozzle assemblies for various applications including shaving foams and carpet cleaners under various trade names including City®, Montego®, Power Jet®, Vulcan® and Visco®. Nozzles which disperse the foam both horizontally and vertically (when the container is held upright) are available. In order for the apparatus to be effective in the method of the present invention it should preferably deliver the foam at a rate of at least 3 g per second of foam from the sealed container, more preferably at a rate of at least 10 g per second.

Dosing Means

Dosing means for foams are known to the man skilled in the art, for example from U.S. Pat. No. 3,858,771, issued on Jan. 7, 1975, assigned to Société Lablabo; WO9108965, published on Jun. 27, 1991 applied for by Precision Valve Corporation; EP-A 0 616 953, published on Sep. 28, 1994 and WO9429192, published on Dec. 22, 1994, both applied for by Minnesota Mining and Manufacturing Company.

EXAMPLES

All components are % by weight

|  | Ex 1 | Ex 2 | Ex 3 | Ex 4 | Ex 5 |
|---|---|---|---|---|---|
| Alkyl sulphate | 9.37 | 14.4 | 10.5 | — | 14.1 |
| Alkyl ether sulphate | 6.82 | 4.13 | 1.77 | 17 | — |
| Nonionic surfactant | 1.59 | 0.54 | 4.83 | 3.9 | 6.33 |
| Fatty acid | 0.62 | — | 1.7 | 0.6 | 0.5 |
| Citric acid | 0.12 | — | 0.18 | — | — |
| Phosphonate | 0.3 | — | — | — | — |
| Propane diol | 1.87 | — | — | — | — |
| Propanol |  |  |  |  |  |
| Ethanol | 4 | — | — | — | — |
| Water |  |  | to balance |  |  |
| Viscosity (mPa · s) | 1040 | 700 | 680 | 640 | 620 |
| Density (g/l) | 1030 | 1026 | 1010 | 1035 | 1020 |
| pH | 7 | 6.5 | 8.5 | 9 | 7 |

|  | Ex 6 | Ex 7 | Ex 8 | Ex 9 | Ex 10 |
|---|---|---|---|---|---|
| Alkyl sulphate | 15.31 | 12.1 | 13.5 | — | 12.5 |
| Alkyl ether sulphate | — | 1.72 | 4 | 4.62 | 12.5 |
| Nonionic surfactant | 3.74 | 5.57 | 21.5 | 16.62 | 24.6 |
| Fatty acid | 0.52 | 1.3 | 1.3 | 4.29 | 14.8 |
| Phosphonate | — | — | — | — | 1 |
| Propane diol | — | — | — | — | 13 |
| Propanol | — | — | 7 | — | — |
| Ethanol | — | — | 5.14 | 4.57 | 1.3 |
| Water |  |  | to balance |  |  |
| Viscosity (mPa · s) | 365 | 760 | 600 | 300 | 775 |
| Density (g/l) | 1018 | 1010 | 1032 | 1000 | 1040 |
| pH | 8 | 8.5 | 8.5 | 8 | 7 |

In all Examples viscosity was measured using a Brookfield Viscometer, Spindle no. 2, at 60 rpm.

Examples 1 to 10

Liquid detergent compositions were prepared according to the compositions of Examples 1 to 10. 250 g of each product were packed into metal aerosol containers, each container having a nominal capacity of 335 ml. 25 g of propane/butane propellant was then added to each container. The product was dispensed in the form of a low density foam (25 to 100 g/l) from a nozzle in the container.

A bowl was filled with 5 liters of water at 20° C. 40 g of foam was dispensed onto the surface of the water and largely dissolved by gentle agitation by hand to form a wash liquor. A laundry load consisting of different garments made of delicate fabrics including silk, wool, fine cotton and or synthetics was then placed into the wash liquor and gently agitated by hand for 5 minutes. Subsequently the laundry was rinsed clean of the residue of wash liquor using city water at 20° C. The laundry was then dried. Excellent cleaning results were obtained with good colour maintenance and fabric care performance.

The method of Examples 1 to 10 was repeated by placing the laundry load into the water, subsequently dispensing 40 g of foam onto the water surface and agitating by hand for 5 minutes to enhance the dissolving and cleaning process. Similar results were obtained.

Examples 11 to 20

A laundry load was placed into a bowl and 5 liters of water at 20° C. were added on top of the load. Subsequently 40 g of foam was dispensed onto the water surface and agitating by hand for 5 minutes to enhance the dissolving and cleaning process. The wash process was repeated for each of the compositions of Examples 1 to 10. Similar results were obtained.

Examples 21 to 30

40 g of foam according to the composition of each of examples 1 to 10, was dispensed into a bowl, 5 liters of water was then poured into the bowl to form the wash liquor, and the laundry load was added to the wash liquor. The method was repeated by dispensing 40 g of foam into the bowl, adding the laundry load on top of the foam, and adding 5 liters of water to the bowl. In all cases agitation by hand for 5 minutes enhanced the dissolving and cleaning process.

Examples 31 to 40

40 g of foam according to the composition of each of examples 1 to 10 was dispensed onto the fabric of a laundry load. The load and foam was then placed into a domestic washing machine which was subsequently operated according to a preprogrammed cycle (at 40° C.) starting with the addition of water into the machine drum.

What is claimed is:

1. A method of cleaning a textile fabric comprising the steps of:
    (i) providing a foaming detergent composition comprising:
        (a) at least 10%, by weight, of a surfactant, the surfactant including at least an anionic surfactant;
        (b) from 65% to less than 90%, by weight, of water;
        (c) from 0.1% to 20% by weight, of a builder; and
        (d) a propellant selected from the group consisting of alkanes, nitrous oxide, nitrogen, air and mixtures thereof;
    wherein the detergent composition is packaged in an aerosol container and wherein the weight percents above are on a propellant-free basis;
    (ii) dispensing the foaming detergent composition from the aerosol container;
    (iii) dissolving the foaming detergent composition in water to form an aqueous solution; and
    (iv) agitating the textile fabric in the aqueous solution.

2. A method of cleaning textile fabrics according to claim 1 wherein the foaming detergent composition comprises from 10% to 18%, by weight, of surfactant.

3. A method of cleaning a textile fabric according to claim 1, wherein the foaming detergent composition comprises at least 18% by weight of a surfactant, the surfactant including at least an anionic surfactant.

4. A method of cleaning textile fabrics according to claim 1 wherein the foaming detergent composition is free of phosphates.

5. A method of cleaning a textile fabric according to claim 1 wherein step (iv) comprises agitation of the textile fabric in the aqueous solution by hand.

6. A method of cleaning a textile fabric according to claim 1 wherein step (iv) comprises agitation of the textile fabric in the aqueous solution in a washing machine.

7. A method according to claim 1 wherein the aerosol container comprises a propellant gas selected from the group consisting of alkanes, nitrogen, and mixtures thereof.

8. A method of cleaning a textile fabric according to claim 2, wherein the foaming detergent comprises at least about 5% by weight of anionic surfactant.

9. A method of cleaning a textile fabric according to claim 1, wherein the propellant is nitrous oxide or air.

* * * * *